(12) United States Patent
Sethi et al.

(10) Patent No.: US 11,627,057 B2
(45) Date of Patent: Apr. 11, 2023

(54) VIRTUAL NETWORK FUNCTION RESPONSE TO A SERVICE INTERRUPTION

(71) Applicant: HEWLETT PACKARD ENTERPRISE DEVELOPMENT LP, Houston, TX (US)

(72) Inventors: Aseem Sethi, Bangalore (IN); Mark Andrew Denny, Santa Clara, CA (US)

(73) Assignee: Hewlett Packard Enterprise Development LP, Spring, TX (US)

(*) Notice: Subject to any disclaimer, the term of this patent is extended or adjusted under 35 U.S.C. 154(b) by 0 days.

(21) Appl. No.: 17/282,849

(22) PCT Filed: Nov. 1, 2018

(86) PCT No.: PCT/US2018/058619
§ 371 (c)(1),
(2) Date: Apr. 5, 2021

(87) PCT Pub. No.: WO2020/091776
PCT Pub. Date: May 7, 2020

(65) Prior Publication Data
US 2021/0351992 A1   Nov. 11, 2021

(51) Int. Cl.
| | |
|---|---|
| *H04L 41/5025* | (2022.01) |
| *H04L 12/46* | (2006.01) |
| *H04L 41/0604* | (2022.01) |
| *H04L 41/0631* | (2022.01) |
| *H04L 41/0654* | (2022.01) |

(52) U.S. Cl.
CPC ...... *H04L 41/5025* (2013.01); *H04L 12/4641* (2013.01); *H04L 41/0627* (2013.01); *H04L 41/0631* (2013.01); *H04L 41/0654* (2013.01)

(58) Field of Classification Search
CPC ............ H04L 41/5025; H04L 12/4641; H04L 41/0627; H04L 41/0631; H04L 41/0654; H04L 12/46
See application file for complete search history.

(56) References Cited

U.S. PATENT DOCUMENTS

| | | |
|---|---|---|
| 9,760,428 B1 | 9/2017 | Felstaine et al. |
| 10,057,109 B2 | 8/2018 | Shatzkamer et al. |

(Continued)

FOREIGN PATENT DOCUMENTS

| | | |
|---|---|---|
| WO | 2017/198019 A1 | 11/2017 |
| WO | 2017/215756 A1 | 12/2017 |

(Continued)

OTHER PUBLICATIONS

Aruba, "Aruba SD-WAN", Datasheet, Jun. 12, 2018, 9 pages.

(Continued)

*Primary Examiner* — Brian Whipple
*Assistant Examiner* — James Ross Hollister
(74) *Attorney, Agent, or Firm* — Trop, Pruner & Hu, P.C.

(57) ABSTRACT

In some examples, a first virtual network function (VNF) that is part of a collection of interconnected VNFs detects a service interruption in a network that includes the collection interconnected VNFs. In response to detecting the service interruption, the first VNF sends control information to a target entity, the control information specifying an action to take to change a communication flow through the collection of interconnected VNFs.

20 Claims, 4 Drawing Sheets

(56) References Cited

U.S. PATENT DOCUMENTS

| | | | |
|---|---|---|---|
| 2014/0229945 A1 | 8/2014 | Barkai et al. | |
| 2016/0224409 A1* | 8/2016 | Liu | G06F 11/0712 |
| 2017/0126792 A1 | 5/2017 | Shirazipour et al. | |
| 2017/0141974 A1 | 5/2017 | Lahiri | |
| 2017/0279668 A1 | 9/2017 | Shevenell et al. | |
| 2018/0011730 A1* | 1/2018 | Zembutsu | H04L 41/0836 |
| 2018/0026832 A1* | 1/2018 | Yu | H04L 41/0893 |
| | | | 370/216 |
| 2018/0123870 A1* | 5/2018 | Xue | H04L 41/0663 |
| 2018/0234288 A1 | 8/2018 | Soderlund | |
| 2018/0309621 A1* | 10/2018 | Yuan | H04L 41/0672 |
| 2018/0359160 A1* | 12/2018 | Calo | G06F 9/45558 |
| 2019/0149397 A1* | 5/2019 | Celozzi | G06F 9/45558 |
| | | | 370/228 |
| 2020/0007413 A1* | 1/2020 | Kerpez | H04L 41/5058 |

FOREIGN PATENT DOCUMENTS

| | | | | |
|---|---|---|---|---|
| WO | WO-2018174759 A1 | * | 9/2018 | |
| WO | 2020/091777 A1 | | 5/2020 | |

OTHER PUBLICATIONS

Cengn, "SDN/NFV/SD-WAN", available online at <https://www.cengn.ca/service-view/sdn-nfv-sdwan/>, 2017, 6 pages.

Darpa Internet Program, "Transmission Control Protocol", Protocol Specification, RFC: 793, Sep. 1981, 90 pages.

Durante et al., "A Model for the Analysis of Security Policies in Service Function Chains", IEEE, 2017, 6 pages.

Hodges et al., "SD-WAN Implementation & Differentiation Layer Strategies", Juniper Networks, Feb. 2017, pp. 1-10.

Kolias, Christos, "Bundling NFV and SDN for Open Networking", NetSeminar @ Stanford, May 22, 2014, 37 pages.

Natal et al., "Global State, Local Decisions: Decentralized NFV for ISPs via enhanced SDN", IEEE, 2017, pp. 1-7.

NFV Resources, "What is a Virtual Network Function or VNF?", available online at <https://web.archive.org/web/20180724133844/https://www.sdxcentral.com/nfv/definitions/virtual-network-function/>, Jul. 24, 2018, 2 pages.

SDX Central, "What is Software-Defined WAN (or SD-WAN or SDWAN)?", downloaded Oct. 6, 2018, 6 pages.

Shiomoto et al., "Research Challenges for Network Function Virtualization—Re-Architecting Middlebox for High Performance and Efficient, Elastic and Resilient Platform to Create New Services", IEICE Trans. Communication, vol. E101-B, No. 1, Jan. 2018, pp. 96-122.

Wikipedia, "Network Function Virtualization", available online at <https://en.wikipedia.org/wiki/Network_function_virtualization>, Aug. 10, 2018, 5 pages.

Wikipedia, "Software Defined Networking", available online at <https://en.wikipedia.org/w/index.php?title=Software-defined_networking&oldid=862004458>, Oct. 1, 2018, 15 pages.

* cited by examiner

VIRTUAL NETWORK FUNCTION RESPONSE TO A SERVICE INTERRUPTION

BACKGROUND

Network function virtualization refers to a technology for virtualizing various network functions within a network. With network function virtualization, virtual network functions (VNFs) can be deployed to perform respective network-related tasks. The VNFs can be executed in one computing node or a number of computing nodes.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A virtual network function (VNF) can refer to a virtual entity that is to perform corresponding network-related tasks. A VNF can be implemented as machine-readable instructions executed on a computing node. As used here, a "computing node" can refer to a computer, a processor, multiple processors, or any other physical infrastructure that is capable of executing machine-readable instructions.

Deploying VNFs as part of network function virtualization can be associated with various example benefits. For example, a VNF can be designed, configured, and deployed in a network more quickly than a hardware network component. Moreover, in general, VNFs are less costly than respective hardware network components for performing corresponding network-related tasks. In addition, a VNF is more easily customizable than hardware network components to target specifications of different users.

A collection of interconnected VNFs can be deployed on one computing node or multiple computing nodes. In some examples, the collection of interconnected VNFs includes a chain of VNFs, where the different VNFs in the chain can successfully perform respective network-related tasks. In other examples, a collection of interconnected VNFs can include some subset of the VNFs connected in a chain and another subset of the VNFs connected in parallel. More generally, a collection of interconnected VNFs refers to any group of VNFs that are functionally, logically, and/or physically connected or related to one another.

Examples of different types of VNFs include the following: a virtualized load balancer to balance network communication across multiple network paths of a network, a virtualized firewall that protects a network from unauthorized intrusion from outside the network, a virtualized intrusion detection device to detect intrusion into a network by an unauthorized entity, a virtualized switch or router to switch or route data packets based on network addresses and possibly other fields in the data packets, and so forth.

If a given VNF within a collection of interconnected VNFs experiences a fault, e.g., due to the given VNF crashing or experiencing an error (or a computing node on which the given VNF is executed crashing or experiencing an error), then a service interruption in a network that includes the collection of interconnected VNFs may occur. A service interruption can refer to any interruption of communication of data within a communication flow established between host entities, where the communication flow passes through the collection of interconnected VNFs. A communication flow can refer to an identifiable flow of data among entities coupled to a network. Identification of the flow can be based on any or some combination of a network address, a port number that identifies a port, and so forth.

A "host entity" can refer to an electronic device or a program (including machine-readable instructions) executable in a physical machine or virtual machine, where the host entity is able to establish a communication flow with another host entity. A host entity can be an endpoint of the communication flow. In some examples, the communication flow that can be established between host entities can be a Transmission Control Protocol (TCP) flow, which is a communication protocol that provides for reliable, ordered, and error-checked delivery of data between TCP layers associated with the host entities. Although reference is made to TCP according to some examples, it is noted that in other examples, other communication protocols can govern communication flows between host entities.

A communication flow, such as a TCP flow, can be associated with a timeout duration that is tracked by a timer. The timer can be started in response to a specified event, such as transmission of a data packet by the sender. If an acknowledgement is not received within the timeout duration, the timer expires. More generally, expiration of a timeout duration associated with a communication flow may be caused by some specified inactivity in the communication flow. Expiration of the timeout duration can provide an indication to a host entity that a service interruption has occurred in the network. The timeout duration is generally relatively long (e.g., several seconds or minutes). Thus, waiting for expiration of the timeout duration to detect a service interruption can cause a delay in recovering from the service interruption.

Additionally, detecting a service interruption based on expiration of a timeout duration does not provide any indication of a network location (within a network) associated with the service interruption. As a result, to recover the service interruption, a system may be restricted to tearing down the communication flow and establishing a new communication flow. Other recovery options may not be available or practical. Tearing down a communication flow and setting up a new communication flow can take a relatively long period of time, and can consume network bandwidth and processing resources.

In accordance with some implementations of the present disclosure, a first VNF within a collection of interconnected VNFs (where a "first" VNF can refer to any of the VNFs of the collection of interconnected VNFs) is able to detect a service interruption in a network that includes the collection of interconnected VNFs. In response to detecting the service interruption, the first VNF can send control information to a target entity, where the control information indicates a location of the service interruption and specifies an action to change a communication flow through the collection of interconnected VNFs. The target entity to which the control information is sent can include a second VNF or a host entity.

In some examples, the target entity to which the control information is sent is upstream of the first VNF. The target entity is considered to be "upstream" of the first VNF if communication of data that is interrupted by the service interruption flows in a direction from the target entity to the first VNF. Control information can additionally or alternatively be sent to a downstream target entity. The target entity can be another VNF, or a host entity.

The ability of a VNF to detect a service interruption and to send control information to a target entity to indicate presence of a service interruption can allow for faster recovery from the service interruption (e.g., the system does not have to wait for expiration of a timeout, which can be long). Also, the ability of a VNF to send control information indicating a service interruption upstream allows upstream entities (host entities or VNFs) to become aware of the downstream service interruption. In addition, the ability to provide information indicating the location of the service interruption can allow the target entity to make a more intelligent decision regarding a corrective action to take to recover from the service interruption. Moreover, by including information of a suggested action to take to address the service interruption in the control information, the target entity may be able readily determine which corrective action is appropriate.

Figure 1:
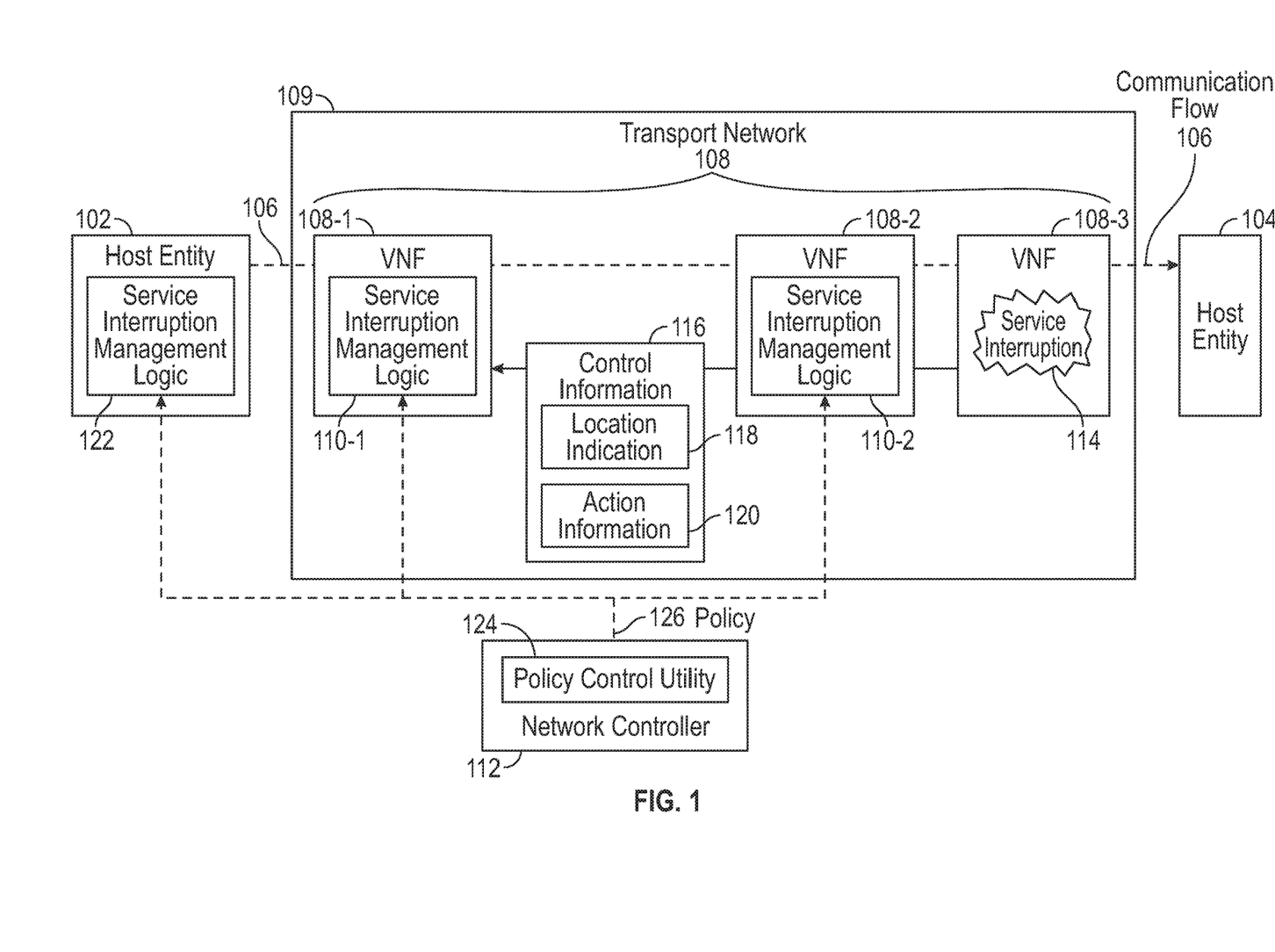
FIG. 1 is a block diagram of a network arrangement including virtual network functions (VNFs) according to some examples.

FIG. 1 is a block diagram of an example network arrangement that includes a first host entity 102 and a second host entity 104 that are able to establish a communication flow 106 between the host entities 102 and 104. Although the example of FIG. 1 shows a communication flow between a pair of host entities 102 and 104, it is noted that in other examples, the communication flow 106 can be established among more than two host entities. For example, the host entity 102 can include a sender that multicasts data to multiple receivers.

The communication flow 106 is depicted as being a flow from the host entity 102 to the host entity 104. In other examples, the communication flow 106 can be from the host entity 104 to the host entity 102, or the communication flow 106 can be bi-directional.

FIG. 1 also shows a collection of interconnected VNFs 108 between the host entities 102 and 104. The collection of interconnected VNFs 108 are part of a transport network 109 for transporting data among host entities. In the example shown in FIG. 1, the collection of interconnected VNFs 108 includes VNFs 108-1, 108-2, and 108-3 connected in a chain. In other examples, at least some of the VNFs can be connected in parallel between the host entities 102 and 104. Although three VNFs are shown in FIG. 1 as being part of a collection, it is noted that a different number (two or greater than two) of VNFs can be used in a collection in other examples.

The VNFs 108-1 to 108-3 can be the same type of VNF (e.g., a router or switch), or at least two of the VNFs 108-1 to 108-3 can be different types of VNFs (e.g., one VNF is a router or switch, while another VNF is a firewall or a virtual intrusion detection device).

The collection of interconnected VNFs 108 can be executed in a single computing node, or alternatively, on multiple computing nodes. Each VNF can be implemented as machine-readable instructions, such as machine-readable instructions executed within a corresponding virtual machine. A virtual machine refers to a virtual environment that is established within a physical computing node. Multiple VMs within a physical machine can share the physical resources of the physical machine.

In some examples, the transport network 109 may be part of a Software-Defined Network (SDN). A type of SDN is a Software-Defined Wide Area Network (SD-WAN) that interconnects multiple networks over a wide geographic area. An SDN is divided into a control plane and a data plane. The data plane includes network entities (e.g., physical network devices and/or VNFs) used for transporting data packets along network paths. The transport of data packets can be based on use of forwarding information (e.g., forwarding tables, routing tables, etc.) accessible by the network entities that forward data packets along selected network paths based on network addresses (e.g., Internet Protocol (IP) addresses, Medium Access Control (MAC) addresses, etc.) and possibly other fields of the data packets. The forwarding of data packets is performed by routers or switches (whether physical or virtual). In further examples, some network entities (whether physical or virtual) can also perform other actions, including firewall protection, intrusion detection, and so forth.

Although FIG. 1 shows the transport network 109 as including VNFs, it is noted that the transport network 109 may additionally include physical network entities in some examples.

The control plane of an SDN includes a network controller 112, which can be referred to as an SDN controller in the SDN context. The network controller 112 can be implemented using a computing node, or multiple computing nodes. The network controller 112 can be used to configure the network entities of the transport network 109, including provisioning forwarding information to routers or switches, and configuring other network entities to perform respective actions.

In other examples, instead of an SDN, techniques or mechanisms according to some implementations of the present disclosure can be used with a different type of network.

FIG. 1 shows that the VNF 108-1 includes a service interruption management logic 110-1, and the VNF 108-2 includes a service interruption management logic 110-2. Although not shown, the VNF 108-3 can also include a service interruption management logic.

A service interruption management logic can be implemented using machine-readable instructions. Generally, service interruption management logic is able to detect presence of a service interruption and to react to the service interruption, as discussed below in some examples.

In the example of FIG. 1, it is assumed that a service interruption 114 has occurred at the VNF 108-3. The service interruption 114 can be due to the VNF 108-3 crashing or experiencing a fault or error, the computing node on which the VNF 108-3 is executed crashing or experiencing a fault or error, or a link that connects to the VNF 108-3 experiencing a fault or error, or a different cause. More generally, the service interruption 114 can be caused by failure or fault of a physical machine, virtual machine, or a program, or can be caused by actions of malware or a human attacker.

The service interruption management logic 110-2 in the VNF 108-2 is able to detect the service interruption 114 associated with the VNF 108-3. For example, neighboring VNFs of the collection of interconnected VNFs 108 can exchange heartbeat indications with one other. A "heartbeat indication" can refer to any signal, message, or information element that is transmitted to provide an indication that a network entity, such as a VNF, is still functional. A heartbeat indication can be transmitted on a periodic basis, or can be transmitted intermittently in response to certain events.

Failure to receive a heartbeat indication by a first VNF from a second VNF within some specified time duration can be an indication that the second VNF has experienced a service interruption. In response to detecting the service interruption 114, the service interruption management logic 110-2 in the VNF 108-2 sends control information 116 to a target entity. In some examples, the control information 116 can be in the form of a control packet (or a number of control packets).

In some examples, the control information 116 can include a UDP packet. Alternatively, the control information 116 can include a packet according an Internet Control Message Protocol (ICMP) protocol. In other examples, other types of control information 116 can be used.

In a more specific example, the control information 116 can include a flow tuple that identifies the communication flow 106. In some examples, the flow tuple can include a source network address (e.g., source IP address) of the host entity 102 that is sending the communication flow 106, a destination network address (e.g., destination IP address) of the host entity 104 that is receiving the communication flow, a source port number, and a destination port number.

The control information 116 can further include information to assist the target entity in determining what suggested action(s) to take. The target entity to which the control information 116 is sent can include another VNF, such as the VNF 108-1, or the host entity 102, or both the VNF 108-1 and the host entity 102. In FIG. 1, the control information 116 is sent in an upstream direction, in an example where the communication flow 106 is from the host entity 102 to the host entity 104. The control information 116 can additionally or alternatively be sent in a downstream direction.

In some examples, the control information 116 includes a location indication 118 and action information 120. The location indication 118 indicates a network location within the transport network 109 where the service interruption 114 occurred. For example, the location indication 118 can be in the form of an identifier (e.g., a network address or other type of identifier) of the VNF 108-3 associated with the service interruption 114. In other examples, the location indication 118 can include information that identifies a computing node, a subnet, or any other network portion in which the service interruption 114 occurred.

The location indication 118 can be used by the target entity (such as by the service interruption logic 110-1 in the VNF 108-1 or a service interruption logic 122 in the host entity 102) to determine where in the transport network 109 the service interruption 114 occurred. The location of the transport network 109 where the service interruption 114 occurred can be useful in determining what action to take, such as selecting from among the following possible actions: tearing down the communication flow 106 and establishing a new communication flow, causing routing of data around the service interruption 114 along a different network path, and so forth.

The action information 120 in the control information 116 specifies an action (or actions) to take to change a communication flow through the collection of interconnected VNFs 108. For example, the action information 120 can specify any or some combination of the following actions: adjust (decrease or increase) a TCP window size, tear down the communication flow 106, impose flow control on the communication flow 106, where flow control can include changing a rate of communication of data in the communication flow 106, selecting a different route through the network, such as part of performing load balancing, and changing a quality-of-service (QoS) policy.

A TCP window size refers to the amount of data (in bytes) that a receiver is willing to receive at any point in time. Load balancing refers to a technique to balance workload across different network paths in a network. A QoS policy specifies a service level to provide for the communication flow. A higher service level means that data communication in the communication flow 106 can occur at a higher data rate, with higher reliability, etc., than a lower service level.

The action taken by a target entity in response to the control information 116 for recovering from the service interruption may or may not be an action specified by the action information 120 in the control information 116.

The corrective action that is taken by the target entity (or more specifically, by the service interruption management logic in the target entity) to recover from the service interruption 114 can be a policy-based corrective action. As shown in FIG. 1, a policy control utility 124 can provide a policy 126 (or multiple policies) to service interruption management logic executed in any of the host entities 102 and 104 and the VNFs 108-1, 108-2, and 108-3.

In some examples, the policy control utility 124 can include machine-readable instructions executable by the network controller 112. In other examples, the policy control utility 124 can include a program or machine separate from the network controller 112.

Each policy 126 can include a rule that determines what corrective action to take based on a factor (or multiple factors). For example, one of the factors considered by a service interruption management logic can be a network location of the service interruption 114. The policy 126 can specify that if the network location is at location X (or upstream or downstream of location X), then the communication flow 106 would have to be torn down and a new communication flow established. On the other hand, the policy 122 can specify that if the network location is not at location X (or not upstream or downstream of location X), then the corrective action can include selecting a different path to take in the transport network 109 for the communication flow 106.

Other factors that can be considered by the service interruption management logic based on the policy 126 can include an amount of data packets transferred in the communication flow 106, a current loading of network entities along a path, a current QoS associated with the communication flow 106, and so forth.

The corrective action that is taken by a service interruption management logic to recover from the service interruption 114 can be based on the policy 126 as well as the action(s) specified by the action information 120 in the control information 116. FIG. 1 shows that the VNF 108-1 includes a service interruption management logic 110-1, and the VNF 108-2 includes a service interruption management logic 110-2. Although not shown, the VNF 108-3 can also include a service interruption management logic.

The corrective action taken can be different from the action specified by the action information 120 in the control information 116. For example, the action information 120 in the control information 116 can specify the tearing down of the communication flow 106 and establishing a new communication flow. However, the policy 122 can specify that the appropriate corrective action to take in response to the service interruption 114 is to select a different network path to route around the service interruption 114.

Figure 2A:
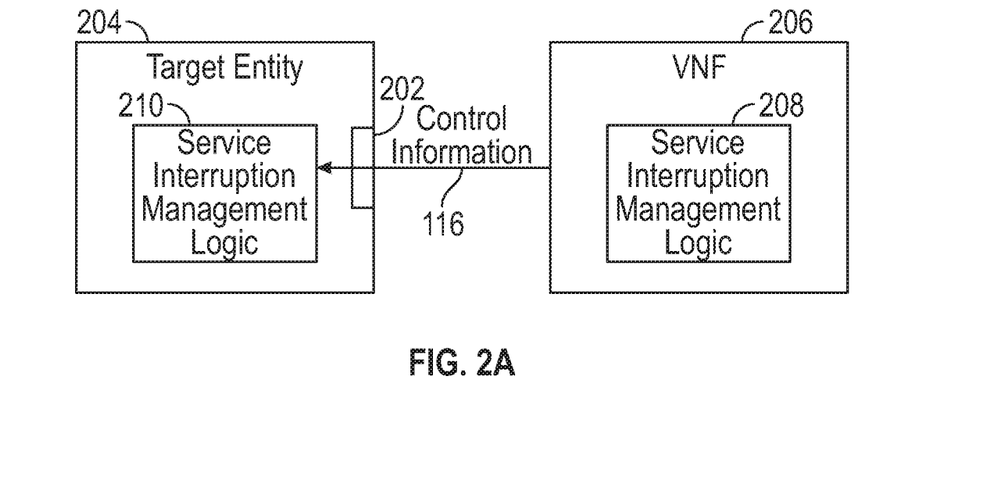
FIGS. 2A and 2B illustrate communication of control information between a VNF and a target entity over respective communication channels, according to some examples.

The control information 116 that can be sent by a VNF can be over a communication channel between the VNF and the target entity. FIG. 2A shows an example where the communication channel includes a specified port 202 associated with a target entity 204. The port 202 can be a TCP port, a User Datagram Protocol (UDP) port, or another type of port. The control information 116 is sent by a service interruption management logic 208 in a VNF 206 to the specified port 202. For example, a control packet that includes the control information 116 can include a port number of the specified port 202. A service interruption management logic 210 in the target entity 204 recognizes information received at the specified port 202 as control information responsive to a service interruption.

Figure 2B:
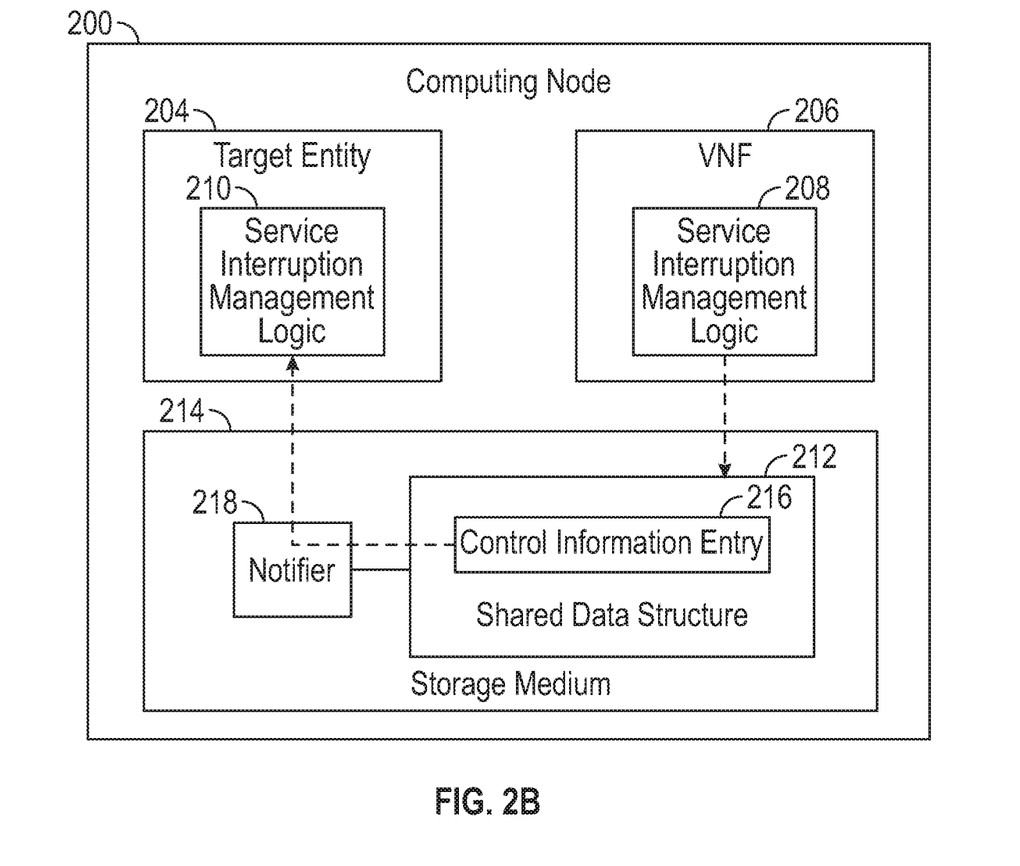

FIG. 2B shows a different example where the communication channel includes a shared data structure 212 stored in a storage medium 214. The storage medium 214 can be implemented using a memory device (or multiple memory devices), a persistent storage device (or multiple persistent storage devices), or any combination thereof.

The storage medium 214 can be part of a computing node 200 that includes the target entity 204 and the VNF 206. In other examples, the target entity 204 and the VNF 206 can be part of different computing nodes, but the storage medium 214 is accessible by the target entity 204 and the VNF 206.

The shared data structure 212 includes control information entries 216. For example, the shared data structure 212 can be in the form of a table or any other data structure.

The service interruption management logic 208 in the VNF 206 can write control information (e.g., 116 in FIG. 1) to a control information entry 216 of the shared data structure 212. Different service interruption management logic in respective different VNFs can write control information to corresponding different control information entries 216.

A notifier 218 includes machine-readable instructions executable in the computing node 200. The notifier 218 can detect addition of a new control information to a control information entry 216 in the shared data structure 212. In response to such detection, the notifier 218 can publish the new control information to the target entity 204 (or multiple target entities). In other examples, instead of using the notifier 218, a target entity 204 can include a listener that polls the shared data structure 212 for updates to the control information entries 216 in the data structure 212.

Figure 3:
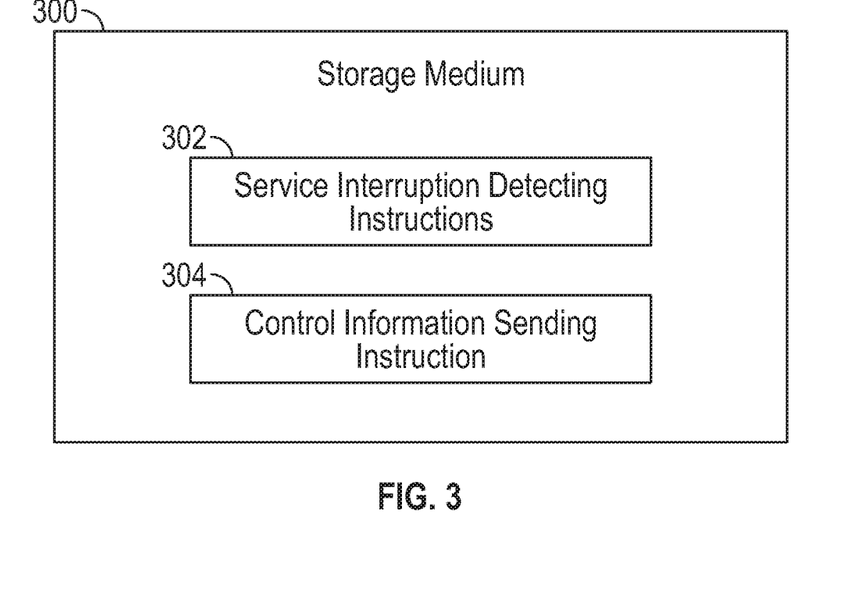
FIG. 3 is a block diagram of a storage medium storing machine-readable instructions according to some examples.

FIG. 3 is a block diagram of a non-transitory machine-readable or computer-readable storage medium 300 storing machine-readable instructions that upon execution cause a system to perform various tasks. The machine-readable instructions include service interruption detecting instructions 302 to detect, by a first VNF that is part of a collection of interconnected VNFs, a service interruption in a network that includes the collection interconnected VNFs. The detection of the service interruption can be based on failure to receive a heartbeat indication from a neighboring VNF. Failure to receive a heartbeat indication by a first VNF from a second VNF within some specified time duration can be an indication that the second VNF has experienced a service interruption.

The machine-readable instructions further include control information sending instructions 304 to, in response to detecting the service interruption, send, by the first VNF, control information to a target entity, the control information specifying an action to take to change a communication flow through the collection of interconnected VNFs. In some examples, the control information can further indicate a network location associated with the service interruption. The target entity to which the control information is sent can include a second VNF and/or a host entity. The first VNF and the second VNF can be the same type of VNF, or different types of VNFs. The sending of the control information can be over a communication channel to the target entity, such as the communication channel shown in FIG. 2A or 2B.

In response to the control information, the target entity can perform a corrective action based on the control information to change the communication flow. Examples of corrective actions include any or some combination of: adjusting a size of a TCP window, tearing down the communication flow and establishing a new communication flow, imposing flow control of the communication flow, selecting a different route through the network, changing a QoS policy, and so forth.

In further examples, each target entity (e.g., a VNF or host entity) to which control information is to be sent can receive a policy, such as from the policy control utility 124 of FIG. 1. The corrective action performed at the target entity in response to the control information can be based on the policy.

In some cases, the first VNF that sent the control information can also perform a corrective action based on the policy to address the service interruption. The corrective action at the first VNF is consistent with the corrective action at the target entity. "Consistent" corrective actions performed at multiple entities can refer to a same corrective action taken at the multiple entities, or corrective actions taken at the multiple entities that address the service interruption in a manner that does not conflict with one another. By taking consistent corrective actions at the multiple entities to recover from the service interruption, conflicting corrective actions at the multiple entities can be avoided such that errors do not result in a communication flow.

Figure 4:
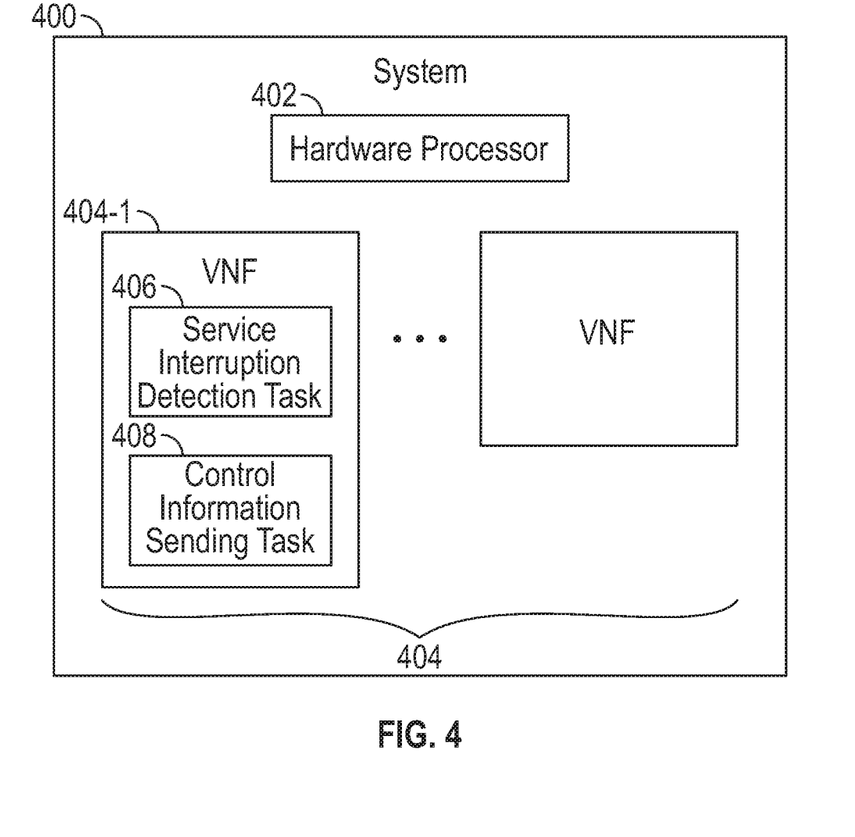
FIG. 4 is a block diagram of a system according to some examples.

FIG. 4 is a block diagram of a system 400, which can include a computing node or multiple computing nodes. The system 400 includes a hardware processor 402 (or multiple hardware processors). A hardware processor can include a microprocessor, a core of a multi-core microprocessor, a microcontroller, a programmable integrated circuit, a programmable gate array, or another hardware processing circuit.

The system 400 further includes a collection of interconnected VNFs 404. A first VNF 404-1 of the collection of interconnected VNFs is executable on the hardware processor to perform various tasks. The tasks include a service interruption detection task 406 to detect a service interruption in a network that includes the collection interconnected VNFs 404. As noted above, the detection can be based on failure to receive a heartbeat indication.

The tasks further include a control information sending task 408 to, in response to detecting the service interruption, send, using a communication channel, control information to a target entity that is upstream of the first VNF, the control information specifying an action to take to change a communication flow established between host entities through the collection of interconnected VNFs.

In some examples, the communication channel includes a specified port (e.g., 202 in FIG. 2A) or a shared data structure (e.g., 212 in FIG. 2B) stored in a storage medium.

The control information is to cause the target entity to perform a corrective action to address the service interruption without first waiting for expiration of a timeout duration of a communication protocol that governs the communication flow.

Figure 5:
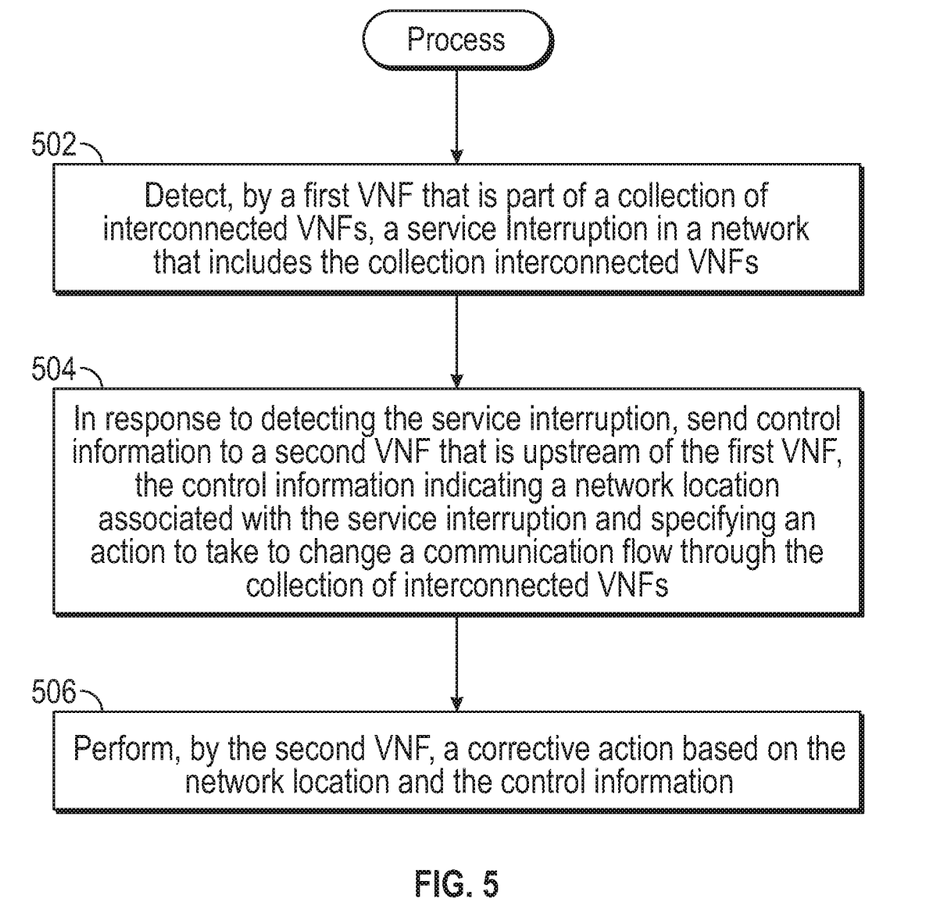
FIG. 5 is a flow diagram of a process according to some examples.

FIG. 5 is a flow diagram of a process that can be performed by a system including a hardware processor. The process of FIG. 5 includes detecting (at 502), by a first VNF that is part of a collection of interconnected VNFs, a service interruption in a network that includes the collection interconnected VNFs. The process includes, in response to detecting the service interruption, sending (at 504) control information to a second VNF that is upstream of the first VNF, the control information indicating a network location associated with the service interruption and specifying an action to take to change a communication flow through the collection of interconnected VNF. The control information can indicate the network location by identifying a VNF, a portion of the network, or a device that experienced a fault causing the service interruption.

The process includes performing (at 506), by the second VNF, a corrective action based on the network location and the control information.

The storage medium 300 of FIG. 3 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:
receive a policy at each virtual network function (VNF) of a collection of interconnected VNFs,
wherein each policy is based on at least one of a respective network location associated with a respective service interruption, an amount of data packets transferred in a respective communication flow, a current loading of network entities along a path, and a current quality-of-service associated with the respective communication flow and wherein each policy is further used to determine a respective corrective action;
detect, by a first VNF of the collection of interconnected VNFs, a service interruption in a network that includes the collection interconnected VNFs; and
in response to detecting the service interruption:
send, by the first VNF, control information to a target entity, the control information specifying a network location associated with the service interruption and an action to take to change a communication flow through the collection of interconnected VNFs,
wherein the action specified by the control information comprises at least one of adjusting a size of a Transmission Control Protocol window, imposing data rate control of the communication flow, and changing a quality-of-service policy; and
wherein when the target entity is a second VNF of the collection of interconnected VNFs, the instructions upon execution cause the system further to perform, by the second VNF, a corrective action based on the action specified in the control information and a respective policy received at the second VNF.

2. The non-transitory machine-readable storage medium of claim 1, wherein the target entity to which the control information is sent comprises the second VNF.

3. The non-transitory machine-readable storage medium of claim 1, wherein the target entity to which the control information is sent comprises a host entity that is an endpoint of the communication flow.

4. The non-transitory machine-readable storage medium of claim 1, wherein the action specified by the control information further comprises at least one of tearing down the communication flow and selecting a different route through the network.

5. The non-transitory machine-readable storage medium of claim 1, wherein the target entity is the second VNF of the collection of interconnected VNFs, and wherein the instructions upon execution cause the system to:
perform the corrective action at the second VNF based on the control information to change the communication flow.

6. The non-transitory machine-readable storage medium of claim 1, wherein the instructions upon execution cause the system to:
perform a corrective action at the first VNF based on the policy to address the service interruption, wherein the corrective action at the first VNF is consistent with the corrective action at the second VNF.

7. The non-transitory machine-readable storage medium of claim 6, wherein the instructions upon execution cause the system to determine that the corrective action at the first VNF is consistent with the corrective action at the second VNF based on at least one of:
the corrective action at the first VNF being the same as the corrective action at the second VNF; and
the corrective action at the first VNF addressing the service interruption in a manner that does not conflict with the corrective action at the second VNF.

8. The non-transitory machine-readable storage medium of claim 1, wherein the corrective action at the second VNF is different from the action specified in the control information.

9. The non-transitory machine-readable storage medium of claim 1, wherein the target entity is upstream of the first VNF.

10. A system comprising:
a hardware processor;
a collection of interconnected virtual network functions (VNFs), wherein each VNF is to receive a policy based on at least one of a respective network location associated with a respective service interruption, an amount of data packets transferred in a respective communication flow, a current loading of network entities along a path, and a current quality-of-service associated with the respective communication flow and wherein each policy is further used to determine a respective corrective action;
a first VNF of the collection of interconnected VNFs executable on the hardware processor to:
detect a service interruption in a network that includes the collection interconnected VNFs; and
in response to detecting the service interruption:
send, using a communication channel, control information to a target entity that is upstream of the first VNF, the control information specifying a network location associated with the service interruption and an action to take to change a communication flow established between host entities through the collection of interconnected VNFs,
wherein the action specified by the control information comprises at least one of adjusting a size of a Transmission Control Protocol window, imposing data rate control of the communication flow, and changing a quality-of-service policy,
which allows the target entity to perform a corrective action based on the action specified in the control information and a policy received at the target entity.

11. The system of claim 10, wherein the communication channel comprises a specified port or a shared memory.

12. The system of claim 10, wherein the target entity comprises a second VNF of the collection of interconnected VNFs, and wherein the second VNF is to perform a corrective action in response to the control information, the second VNF of a type different from the first VNF.

13. The system of claim 12, wherein the second VNF is to perform the corrective action based on the policy in response to the control information, and wherein the first VNF is to perform a corrective action based on the policy to address the service interruption.

14. The system of claim 12, wherein the corrective action performed by the second VNF is based on the network location and the policy.

15. The system of claim 10, wherein the control information is to cause the target entity to perform a corrective action to address the service interruption without first waiting for expiration of a timeout duration of a communication protocol that governs the communication flow.

16. A method performed by a system comprising a hardware processor, comprising:
receiving a policy at each virtual network function (VNF) of a collection of interconnected VNFs,
wherein each policy is based on at least one of a respective network location associated with a respective service interruption, an amount of data packets transferred in a respective communication flow, a current loading of network entities along a path, and a current quality-of-service associated with the respective communication flow and wherein each policy is further used to determine a respective corrective action;
detecting, by a first VNF of the collection of interconnected VNFs, a service interruption in a network that includes the collection interconnected VNFs;
in response to detecting the service interruption, sending control information to a second VNF that is upstream of the first VNF, the control information indicating a network location associated with the service interruption and specifying an action to take to change a communication flow through the collection of interconnected VNFs,
wherein the action specified by the control information comprises at least one of adjusting a size of a Transmission Control Protocol window, imposing data rate control of the communication flow, and changing a quality-of-service policy; and
performing, by the second VNF, a corrective action based on the control information and a respective policy received at the second VNF.

17. The method of claim 16, wherein the corrective action is a policy-based corrective action based on a policy.

18. The method of claim 16, wherein the communication flow is according to a communication protocol, and wherein the control information is to cause the second VNF to perform a corrective action to address the service interruption without first waiting for expiration of a timeout duration of the communication protocol.

19. The method of claim 16, wherein the control information indicates the network location by identifying a VNF, a portion of the network, or a device that experienced a fault causing the service interruption.

20. The method of claim 16, further comprising:
performing a corrective action at the first VNF based on the policy to address the service interruption, the corrective action at the first VNF being consistent with the corrective action at the second VNF based on at least one of:
the corrective action at the first VNF being the same as the corrective action at the second VNF; and
the corrective action at the first VNF addressing the service interruption in a manner that does not conflict with the corrective action at the second VNF.

\* \* \* \* \*